United States Patent [19]
Ng

[11] Patent Number: 6,098,908
[45] Date of Patent: Aug. 8, 2000

[54] CONFIGURATION OF AN ACTUATION MECHANISM WHICH CONTROLS OPERATION OF A SUB-DRAG MECHANISM IN A FISHING REEL

[75] Inventor: Keng Huat Ng, Singapore, Singapore

[73] Assignee: Shimano Singapore PTE. Ltd., Jurong Town, Singapore

[21] Appl. No.: 09/228,627

[22] Filed: Jan. 12, 1999

[30] Foreign Application Priority Data

Sep. 8, 1998 [JP] Japan .................. 10-272616

[51] Int. Cl.[7] .................. A01K 89/027
[52] U.S. Cl. .................. 242/246; 242/245
[58] Field of Search .................. 242/245, 246

[56] References Cited

U.S. PATENT DOCUMENTS

| 952,535 | 3/1910 | Loomis . | |
|---|---|---|---|
| 2,760,357 | 8/1956 | Burns . | |
| 4,344,587 | 8/1982 | Hildreth . | |
| 4,572,448 | 2/1986 | Ban . | |
| 4,746,077 | 5/1988 | Toda . | |
| 4,830,307 | 5/1989 | Lassi et al. . | |
| 4,834,307 | 5/1989 | Larsson et al. . | |
| 5,240,202 | 8/1993 | Park | 242/246 |
| 5,511,735 | 4/1996 | Kaneko | 242/245 |
| 5,816,516 | 10/1998 | Yamaguchi | 242/246 |
| 5,865,386 | 2/1999 | Tao | 242/246 |

FOREIGN PATENT DOCUMENTS

| 0 392 501 | 10/1990 | European Pat. Off. . |
|---|---|---|
| 0 429 923 | 6/1991 | European Pat. Off. . |
| 2038492 | 1/1971 | France . |
| 34 01 945 | 7/1987 | Germany . |
| 7-24059 | 6/1995 | Japan . |
| 2524565 | 5/1996 | Japan . |
| 2512077 | 7/1996 | Japan . |
| 758626 | 10/1956 | United Kingdom . |
| 1 302 828 | 1/1973 | United Kingdom . |

*Primary Examiner*—Katherine A. Matecki
*Attorney, Agent, or Firm*—Shinjyu An Intellectual Property Firm

[57] ABSTRACT

A fishing reel is constructed with a drag mechanism disposed between a first end of a spool shaft and a spool limiting relative rotation between the spool and the spool shaft. A rotor disposed around the spool is rotated in response to rotation of a handle on the housing for reeling in a fishing line. The handle is connected to a face gear disposed within the housing. A pinion gear contacts the face gear transmitting torque there from to a rotor shaft and then to the rotor. A sub-drag mechanism is mounted within a housing proximate a second end of the spool shaft which selectively limits relative rotation between the spool shaft and the housing. A sub-drag mechanism actuation mechanism is disposed on the same side of the face gear as the pinion gear for locking and unlocking the spool shaft against rotation within the housing, thus enabling and dis-enabling the sub-drag mechanism. The position of the sub-drag mechanism actuation mechanism being on the same side of the face gear as the pinion gear allows for a downsizing of the housing of the fishing reel.

5 Claims, 7 Drawing Sheets

CONFIGURATION OF AN ACTUATION MECHANISM WHICH CONTROLS OPERATION OF A SUB-DRAG MECHANISM IN A FISHING REEL

BACKGROUND OF THE INVENTION

A. Field of the Invention

The present invention relates to an actuation mechanism configuration in a fishing reel, and more specifically, to an actuation mechanism for controlling operation of a sub-drag mechanism in the fishing reel.

B. Description of the Related Art

Fishing reels have become very sophisticated recently. Some fishing reels have special drag mechanisms which provide friction resistance to a spool thus limiting the free rotation of the spool and reducing backlash that is experienced when live bait pulls on the fishing line. For instance, one such fishing reel is disclosed in U.S. Pat. No. 4,746,077 (which corresponds to Japanese Patent Application 60-117177).

In the above mentioned US patent, a fishing reel is provided with a housing that is mountable to the underside of a fishing pole. A spool shaft is fitted into the housing generally parallel to the length of the fishing pole. A spool is attached to a forward end of the spool shaft. The spool includes a drag mechanism connected to the spool shaft and the spool and permits adjustment of the amount of drag force applied to the spool for limiting relative rotation of the spool with respect to the spool shaft to reduce backlash from live bait.

A rotor, which includes a bail member, is supported on the housing and is configured to rotate about the spool for winding a fishing line onto the spool. A driving shaft extends through the housing generally perpendicular to the spool shaft. The driving shaft has correspondingly large face gear fixed thereto. The large face gear is configured with gear teeth on a first axial side thereof, the gear teeth engaged with a pinion gear. The pinion gear is linked to the rotor and bail such that in response to rotation of a handle fixed to one end of the driving shaft, the rotor and bail rotate about the spool.

At a rearward portion of the housing, a sub-drag mechanism is installed on the spool shaft. The sub-drag mechanism permits the adjustment of a selective amount drag force to be applied to the spool shaft. The sub-drag mechanism includes engaging member fixed to one end of the spool shaft, a plurality of clutch disks and a knob for adjusting the force applied to the clutch disks. The engaging member includes a plurality of recesses which are sized to receive a gear tooth formed on a lock member. When the lock member gear tooth is engaged in one of the recesses on the engaging member, the spool shaft is fixed against rotation with respect to the housing. When the lock member is moved out of engagement with the engaging member, the spool shaft may rotate but rotation is limited by the amount of force applied to the clutch disks by the knob.

Movement of the locking member is effected by an actuation mechanism that is disposed between a second axial surface of the face gear and the housing.

The above described configuration is such that the housing must have adequate space to house the face gear, the pinion gear to drive the rotor and bail, and the actuation mechanism to control the sub-drag mechanism. The housing is somewhat large because the actuation mechanism for the sub-drag mechanism is located between the second axial surface of the face gear and the housing. Such an arrangement makes the housing large.

It is desirable to make the fishing reel housing as small as possible to reduce manufacturing costs and make storage of the fishing reel easier by allowing it to take up less storage space. Therefore the above described prior art has drawbacks because the housing must be large to house all of the moving parts.

SUMMARY OF THE INVENTION

One object of the present invention is to provide a fishing reel with a compact arrangement of mechanical parts such that the housing size may be reduced.

Another object of the present invention is to fit an actuation mechanism for a sub-drag mechanism in a location away from a second axial surface of a face gear such that the housing of the fishing reel may be downsized.

In accordance with one aspect of the present invention, a fishing reel includes a reel housing and a spool shaft supported in the housing. A spool is supported on a first end of the spool shaft and a sub-drag mechanism is fixed to the housing proximate a second end of the spool shaft. A rotor shaft extends from the housing and a rotor is disposed about a portion of the spool for winding a fishing line about the spool. A drive shaft extends through the housing generally perpendicular to the spool shaft and a face gear is mounted on the drive shaft. There is a pinion gear mounted on the rotor shaft. The pinion gear is engaged with the face gear such that the rotor rotates in response to rotation of the face gear via the pinion gear. A sub-drag mechanism actuation mechanism is disposed within the housing with the pinion gear disposed between the sub-drag mechanism actuation mechanism and the face gear when viewed from either axial end of the spool shaft thus allowing for a reduction in dimensions of the reel housing.

Preferably, the sub-drag mechanism actuation mechanism includes a cam wheel fixed to the drive shaft and a cam follower configured for selective engagement with the cam wheel, such that in response to the cam follower being engaged with the cam wheel and the cam wheel is rotated, the cam follower is moved along with further portions of the sub-drag mechanism actuation mechanism to dis-engage the sub-drag mechanism and lock the spool shaft against rotation with respect to the housing.

Preferably the fishing reel further includes a drag mechanism connected between the spool and the spool shaft.

Preferably, the sub-drag mechanism actuation mechanism further includes an actuation lever mechanically connected to the cam follower for moving the cam follower from a position spaced apart from the cam wheel into engagement with the cam wheel.

Preferably, the sub-drag mechanism actuation mechanism further includes a lever mechanically connected to the actuation lever, the lever being engagable with a locking member, the locking member being configured to selectively lock the spool shaft against rotation within the housing.

The above configuration of the present invention allows for a more compact housing because the structure within the housing takes up less room that the prior art. Since the sub-drag mechanism actuation mechanism is disposed on the same side of the face gear as the spool shaft, the housing may be downsized making for a more efficient use of space.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENT

Figure 1:
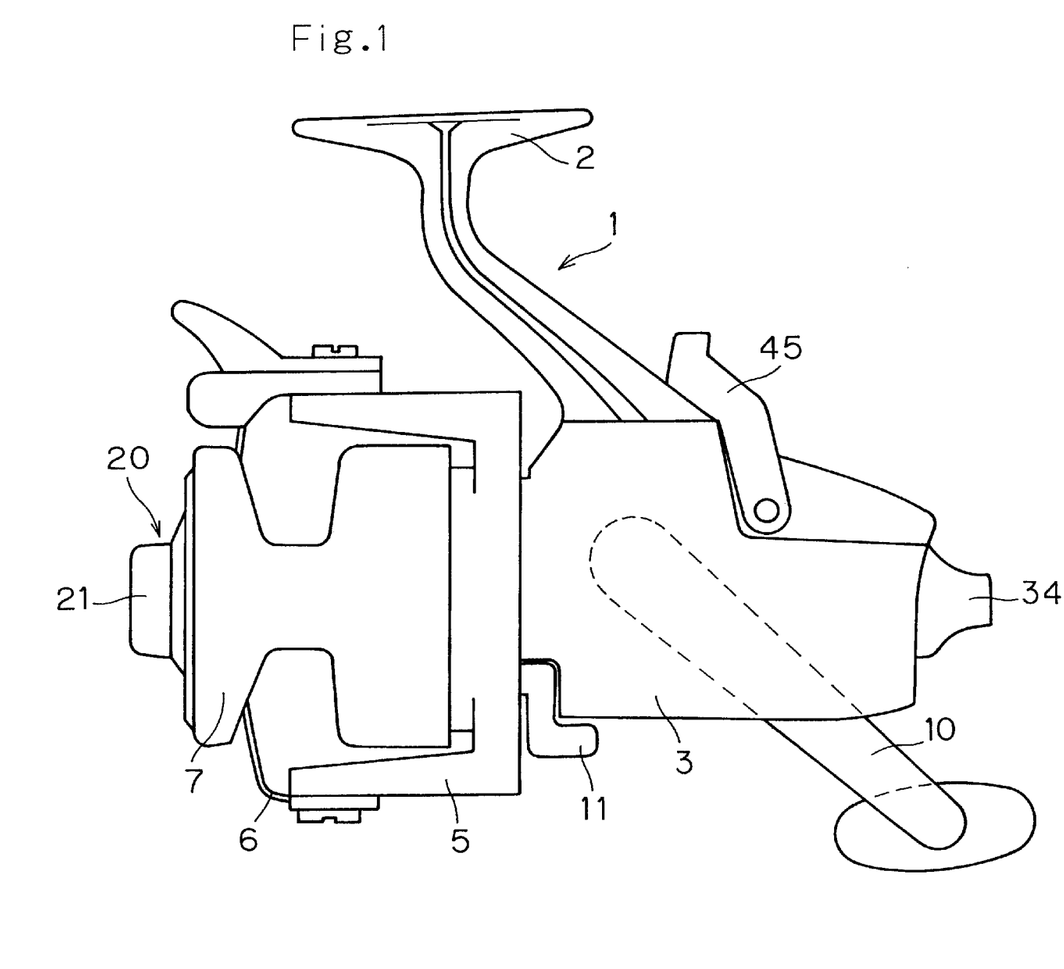
FIG. 1 is a side, elevational view of a fishing reel having an actuation mechanism for controlling a sub-drag mechanism in accordance with a first embodiment of the present invention.

A fishing reel 1 is shown in FIG. 1 in accordance with the present invention. The fishing reel 1 includes a bracket 2 which is used for mounting the fishing reel 1 onto a fishing pole (not shown). The bracket 2 extends from a housing 3. The housing 3 encloses and protects various mechanical components of the fishing reel 1, as is described in greater detail below.

A rotor 5 and bail 6 are rotatably supported on the housing 3. The rotor 5 and bail 6 are configured to rotate about a spool 7. The spool 7 is configured to receive fishing line (not shown). The spool 7 is supported on the end of a spool shaft 8. The spool shaft 8 is shown more clearly in FIG. 2 with the spool 7 removed for clarity. A rotor shaft 9 is coaxially disposed about a portion of the spool shaft 8. The rotor shaft 9 supports the rotor 5 and bail 6.

A reciprocating mechanism 4 is disposed in a lower portion of the housing 3 for moving the spool back and forth (right and left with respect to FIGS. 1, 2 and 3) as the rotor 5 is rotated. The reciprocating mechanism 4 includes a worm shaft 4a and a slider 4b that is attached to the spool shaft 8. The slider 4b is supported on a guide bar that is parallel to the worm shaft 4a. Engagement between the slider 4b and the worm shaft 4a causes the spool shaft 8 to move back and forth in a reciprocating manner. The slider 4b is shown in phantom lines in FIG. 2 but is not depicted in other drawings in order to provide greater clarity for other features of the present invention.

Figure 2:
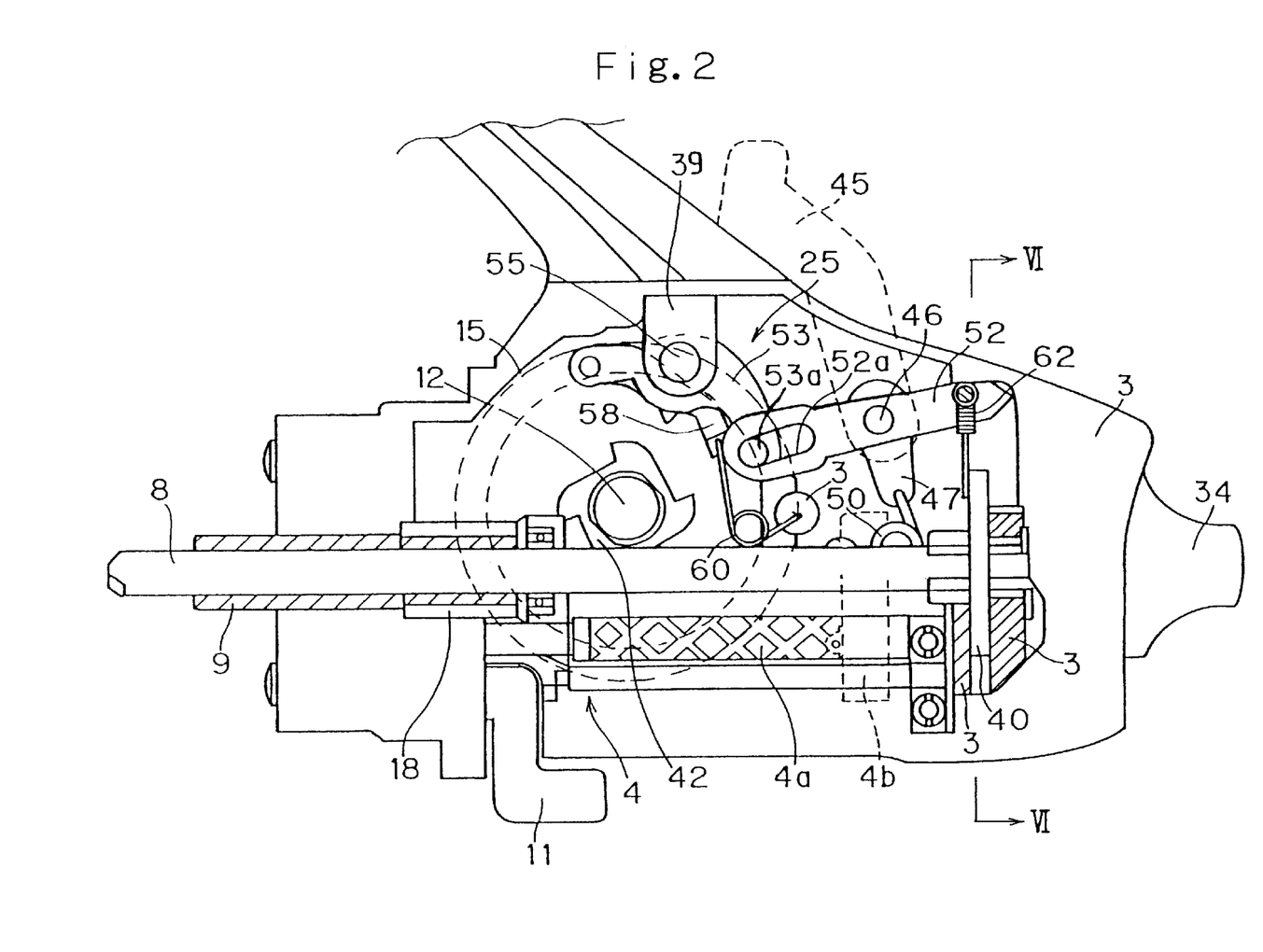
FIG. 2 is a fragmentary, partial cross sectional side view of the fishing reel similar to FIG. 1, on a slightly enlarged scale, showing details of the actuation mechanism in an OFF position, looking from a first side of the fishing reel and with a face gear shown in phantom to reveal details of the actuation mechanism.
Figure 3:
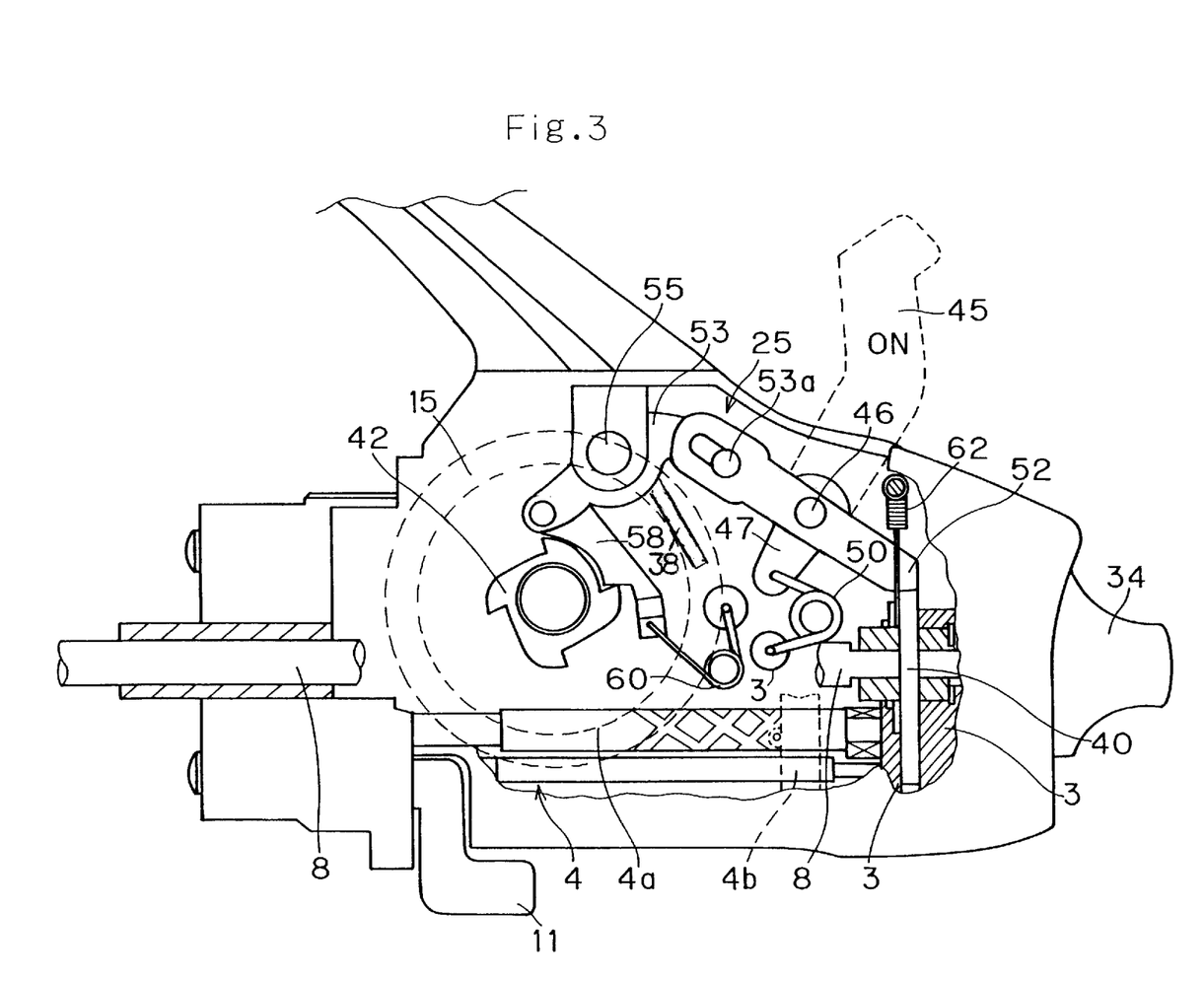
FIG. 3 is a fragmentary, partial cross sectional side view of the fishing reel similar to FIG. 2, showing details of the actuation mechanism in an ON position.

A one way clutch mechanism (not shown) is also fitted into the housing 3 and is engaged and disengaged via a one way clutch lever 11, which is depicted in FIGS. 1, 2 and 3. The one way clutch mechanism (not shown) when engaged permits the rotor to rotate in one direction only. When the one way clutch mechanism is disengaged, the rotor 5 is able to rotate in either rotary direction.

Figure 4:
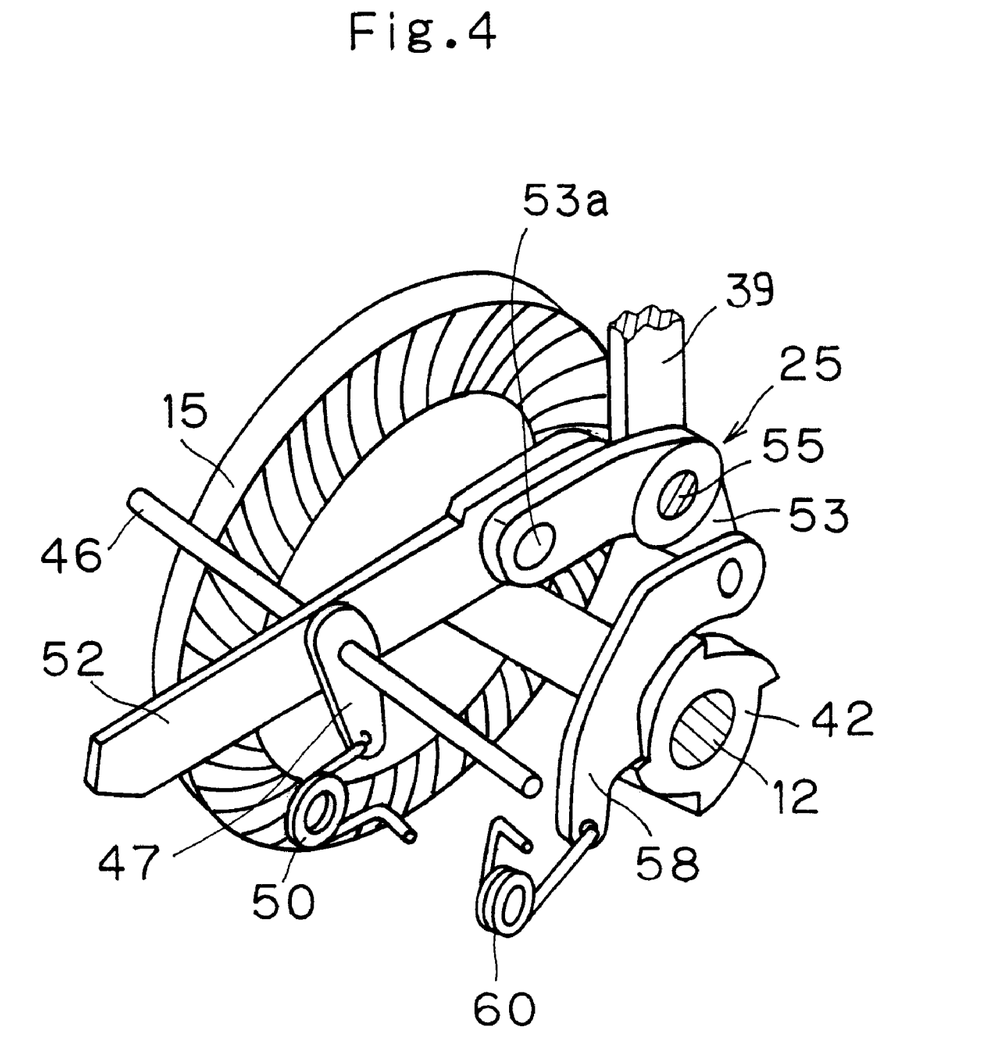
FIG. 4 is a rear perspective view of the actuation mechanism shown removed from the fishing reel, looking from a second side of the fishing reel opposite the first side of FIGS. 2 and 3.

A handle arm 10 extends from an outer surface of the housing 3 as is indicated in FIG. 1. The handle arm 10 is connected to a drive shaft 12. The drive shaft 12 is further connected to a face gear 15 such that when the handle arm 10 is rotated, the drive shaft 12 and face gear 15 rotate together. The face gear 15 is shown in phantom lines in FIGS. 2 and 3 since it would obstruct the view of other elements if shown in solid lines. In other words, the various elements depicted in FIGS. 2 and 3 would be covered by the face gear 15. As will be described in greater detail below, FIG. 4 shows a reverse angle perspective view of the present invention from a side opposite the side FIGS. 2 and 3 are taken from.

A pinion gear 18 is connected to the rotor shaft 9. The pinion gear 18 contacts gear teeth formed in one axial face of the face gear 15 such that as the handle arm 10 is rotated, torque travels from the drive shaft 12 to the face gear 15, then to the pinion gear 18 and further to the rotor 5 via the rotor shaft 9. The rotor 5 further includes a bail pivoting mechanism (not shown) for urging the bail 6 into a line winding position for engaging a fishing line for winding about the spool 7.

The spool 7 further includes a drag mechanism 20. The drag mechanism 20 includes clutch plates (not shown) that are engaged between the distal end of the spool shaft 8 and inner portions of the spool 7. Drag force in the drag mechanism 20 is adjusted by tightening of a plate nut 21 with respect to the spool shaft 8. The plate nut 21 includes a threaded portion (not shown) engaged with a corresponding threaded portion (not shown) formed on the end of the spool shaft 8. Tightening the plate nut 21 causes a spring (not shown) to be compressed against the clutch plates of the drag mechanism 20 to adjust the amount of slippage or relative rotation to be allowed between the spool 7 and the spool shaft 8.

With reference now to FIGS. 2, 3, 4, 5 and 6, an actuation mechanism 25 and sub-drag mechanism 28 are now described.

Figure 5:
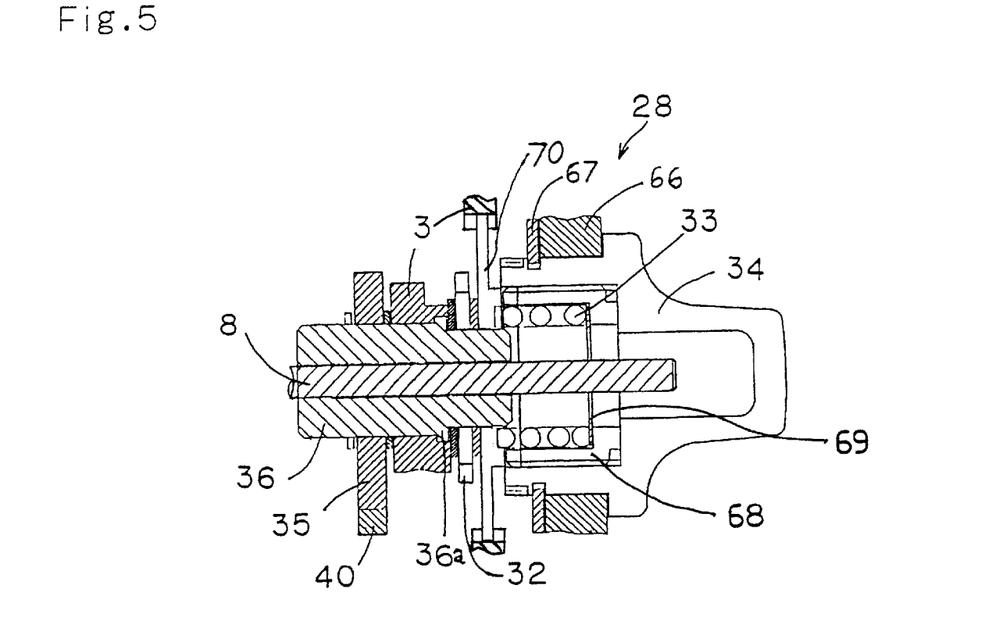
FIG. 5 is a fragmentary, part cross sectional view of the sub-drag mechanism.

The sub-drag mechanism 28 shown in FIG. 5 includes a plurality of clutch plates, including a clutch plate 32 and a coil spring 33 that are disposed between a portion of the housing 3 and an adjuster dial 34. The adjuster dial 34 is fixed to a rear cover 66. The rear cover 66 is fixed to a rear portion of the housing 3. The rear cover 66 is formed with an aperture through which the adjuster dial 34 extends. A dial retainer 67 engages a portion of the adjuster dial 34 inside the rear cover 66 preventing axial movement of the adjuster dial 34 but allows the adjuster dial 34 to rotate. The dial retainer 67 is fixed to the adjuster dial 34 such that as the adjuster dial 34 is rotated, the dial retainer 67 rotates therewith. Further, the adjuster dial 34 is formed with protrusions resembling gear teeth on an outer periphery thereof. The protrusions engage a corresponding protrusion (not shown) within the housing 3 such that upon rotation of the adjuster dial 34, the adjuster dial 34 engages the protrusion making a clicking noise. Similarly, the clutch plate 32 is also formed with gear teeth that engage a similar clicking mechanism (not shown) such that as the clutch plate 32 rotates, a clicking noise is heard.

The adjuster dial 34 is formed on an inner surface thereof with screw threads (not shown) for threaded engagement with corresponding screw threads (not shown) formed on the end of a tensioning screw 68. The tensioning screw 68 has a cup shape that retains the coil spring 33 and an urging member 69.

Figure 6:
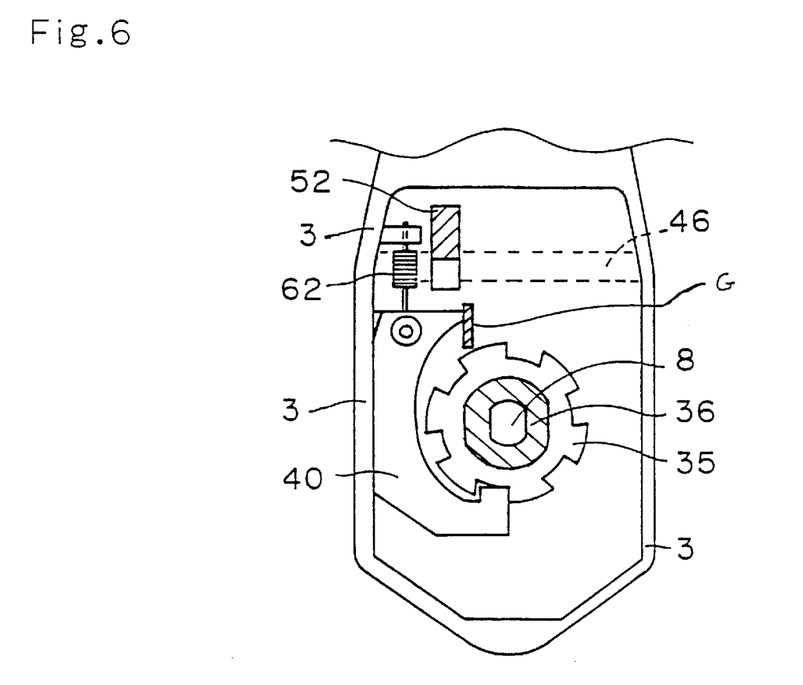
FIG. 6 is fragmentary, part elevation, part cross section rear end view of portions of the sub-drag mechanism and actuation mechanism taken along the line VI—VI in FIG. 2 and looking in the direction of the arrows.

As is shown in FIG. 6, a rear end of the spool shaft 8 has a sort of oval shape, having parallel sides, as is described in greater detail below. The urging member 69 has a round aperture through which the end of the spool shaft 8 extends such that the shaft 8 may rotate freely with respect to the urging member 69 and the tensioning screw 68. The tensioning screw 68 is engaged with a key plate 70 such that the key plate 70 and the tensioning screw 68 may undergo axial movement with respect to one another but may not rotate with respect to one another. The key plate 70 is engaged with a portion of the housing 3 such that the key plate 70 cannot rotate within the housing 3. The key plate 70 is disposed within the rear cover 66 with the coil spring 33 confined between the key plate 70 and the urging member 69.

A sleeve 36 is disposed on the rear end of the shaft 8, as shown in FIGS. 5 and 6. The key plate 70 has a central aperture through which the sleeve 36 extends. The sleeve 36 may undergo relative rotation with respect to the key plate 70. The sleeve 36 is formed with a central aperture that has an oval shape corresponding to the shape of the spool shaft 8. The outer surface of the sleeve is also formed with an oval shape, as can be seen in FIG. 6. Thus, the spool shaft 8 and the sleeve 36 cannot rotate relative to one another. However, the spool shaft 8 may undergo reciprocating movement with respect to the sleeve 36.

The sleeve 36 extends through an aperture in the housing 3, as shown in FIG. 5. The sleeve 36 is formed with an annular protrusion 36*a* which engages the housing 3. The sleeve 36 is restrained from axial movement by a C-clip and the annular protrusion 36*a*. The clutch plates, including the clutch plate 32 are confined between the annular protrusion 36*a* and the key plate 70. Thus, when the adjuster dial 34 is rotated, the tensioning screw 68 and urging member 69 are moved inward toward the key plate 70 in FIG. 5 causing the coil spring 33 to be compressed. Compression of the coil spring 33 urges the key plate 70 against the clutch plates, including the clutch plate 32 and toward the housing 3 to create drag to limit rotation of the sleeve 36 and the spool shaft 8.

The sub-drag mechanism 28 is configured as described above to allow for rotation of the spool shaft 8 with respect to the housing 3, depending on the amount of force applied to the clutches 32 by the coil spring 33. The amount of force applied by the coil spring 33 is dependent upon how tightly screwed the tension screw 69 by the adjuster dial 34.

In the event that there is sufficient force on the spool shaft 8 for it to overcome the drag force generated by the coil spring 33 pressing on the key plate 70 and clutch discs, the clicker mechanism contacting the clutch disc 32 will generate a clicking noise.

The sub-drag mechanism 28 also includes a locking ring 35 which is shown in FIGS. 5 and 6. The locking ring 35 is fixed to a portion of the sleeve 36 such that the locking ring 35 cannot rotate with respect to the spool shaft 8 or the sleeve 36. A locking member 40 is retained within portions of the housing 3 such that the locking member 40 may undergo linear movement up and down with respect to the orientation of the housing 3 in FIG. 6. A locking guide G, shown in FIG. 6, assists in retaining the locking member 40. The locking guide G is attached to the housing 3. In an upper position, as depicted in FIGS. 2, 4 and 6, the locking member 40 engages the locking ring 35 thus preventing the spool shaft 8 from rotating. Further, when the locking ring 35 and locking member 40 are engaged with one another, the sub-drag mechanism 28 cannot operate since rotation of the spool shaft 8 is not possible.

The actuation mechanism 25 includes a cam wheel 42 rigidly fixed to the drive shaft 12. The actuation mechanism 25 also includes an actuation lever 45 that is disposed on the exterior of the housing 3, as shown in FIG. 1. However, in FIGS. 2, 3, and 4, the actuation lever 45 is depicted in phantom because portions of the housing 3 have been cut away to more clearly show details of the invention. The actuation lever 45 is supported on a shaft 46 which extends between opposite inner walls of the housing 3. The shaft 46 is freely rotatable with respect to the housing 3. The actuation lever 45 is rigidly fixed to the shaft 46 such that as the actuation lever 45 is moved, the shaft 46 rotates in accordance with corresponding movement of the actuation lever 45. For instance, the actuation lever 45 may be moved back and forth between the OFF and ON positions depicted in FIGS. 2 and 3, respectively. A first lever 47 is also rigidly fixed to the shaft 46 for rotation therewith. The first lever 47 is connected to a first toggle spring 50. One end of the first toggle spring 50 is connected to the first lever 47 and the other end of the first toggle spring 47 is connected to a portion of the housing 3.

One purpose of the first toggle spring 47 is to maintain the actuation lever 45 the ON and OFF positions depicted in FIGS. 2 and 3, respectively. For instance, the actuation lever 45 is moved away from either the OFF or the ON positions, the first toggle spring 50 is slightly compressed but is able to expand again as the actuation lever 45 moves back to either the OFF or the ON position. Therefore, the first toggles spring 50 biases or toggles the actuation lever 45 into both the ON and OFF positions.

A second lever 52 is also rigidly attached to the shaft 46 such that as the actuation lever 45 is moved to rotate the shaft 46, the second lever 52 also rotates with the shaft 46. Therefore, the actuation lever 45, the first lever 47 and the second lever 52 all move together as a single body.

The second lever 52 is formed with an elongated opening 52*a*, which is more clearly shown in FIGS. 2 and 3. A third lever 53 is mounted on a shaft 55 and is freely pivotable about the shaft 55. The shaft is supported between the housing and a guide plate 39. The guide plate 39 is fixed to an upper portion of the housing 3. The third lever 53 is formed with a pin 53*a* which extends into the elongated opening 52*a* such that as the second lever 52 rotates on the shaft 46, the third lever 53 follows the movement of the second lever 52. For instance, when the actuation lever 45 is moved from the OFF position in FIG. 2 toward the ON position depicted in FIG. 3, the portion of the third lever 53 having the pin 53*a* is moved upward, with respect to FIGS. 2 and 3, due to the engagement between the pin 53*a* and the second lever 52. A cam follower 58 is pivotally connected to the third lever 53. The cam follower 58 is configured for engagement with the cam wheel 42, as is shown in FIGS. 3 and 4. A lower end of the cam follower 58 has an aperture through which one end of a second toggle spring 60 extends. The housing 3 includes a second guide plate 38 which restricts upward movement of the cam follower 58, as is shown in FIG. 3.

A second end of the second toggle spring 60 is fitted into an aperture formed in a portion of the housing 3 such that the second toggle spring 60 biasing the two positions shown in FIGS. 2 and 3. In the position shown in FIG. 2, the two legs of the second toggle spring 60 are being forced apart so that the cam follower 58 is urged in an upward direction toward the third lever 53. In the position shown in FIG. 3, the two legs of the second toggle spring 60 are being compressed toward each other thus urging the cam follower 58 into engagement with the cam wheel 42.

In the ON position shown in FIG. 3, the second lever 52 engages the upper portion of the locking member 40 pushing the locking member 40 downward such that there is no engagement between the locking member 40 and the locking ring 35. Therefore, in the ON position, the spool shaft 8 is able to rotate and the sub-drag mechanism 28 is able to function.

In the OFF position shown in FIGS. 2 and 6, the second lever 52 is dis-engaged from the upper portion of the locking member 40 allowing the locking member 40 to move upward due to the biasing spring 62 such that there is engagement between the locking member 40 and the locking ring 35. Therefore, in the OFF position, the spool shaft 8 is not able to rotate and the sub-drag mechanism 28 is not able to function.

The actuation mechanism 25 operates as follows. With the lever 45 in the OFF position (FIG. 2) the spool shaft 8 may not rotate due to the engagement between the locking member 40 and the locking ring 35. When the lever 45 is moved to the ON position, the second lever 52 engages the upper portion of the locking member 40 allowing the spool shaft 8 to rotate and the sub-drag mechanism 28 to operate. Further, movement of the second lever 52 causes the third lever 53 to move the cam follower 58 into engagement with the cam wheel 42. After a fishing line has been cast out a sufficient amount, the handle arm 10 will eventually be rotated to reel in the fishing line. When the handle arm 10 is rotated, the drive shaft 12 rotates causing the cam wheel 42 to rotate. One of the teeth of the cam wheel 42 will subsequently engage the cam follower 58, since the cam follower 58 is biased by the second toggle spring 60 into engagement with the cam wheel 42. Further rotation of the cam wheel 42 will urge the cam follower 58 upward. The upward movement of the cam follower 58 will cause the third lever 53 to pivot about the shaft 55 thus causing the second lever 52 to become disengaged from the locking member 40. Further, as the second lever 52 moves away from the locking member 40, the first toggle spring will begin to urge the actuation lever 45 toward the OFF position.

With respect to FIG. 4, it should be understood that most of the housing 3, the spool shaft 8 and the pinion gear 18 have been removed in order to more clearly show the actuation mechanism 25. Further, the free ends of the first and second toggle springs 50 and 60 extend into corresponding holes in the housing 3, as is shown in FIGS. 2 and 3. However, although not shown in FIG. 4, the pinion gear 18 is in engagement with the gear teeth formed in the face gear 15. Therefore, it should be understood that the pinion gear 18 and spool shaft 8 extend between the actuation mechanism 25 beneath the drive shaft 12, as shown in FIGS. 2 and 3. The configuration of the present invention is much different from the prior art where actuation mechanisms are typically disposed in a housing with the face gear between the pinion and the actuation mechanism.

There are distinct advantages to the configuration of the present invention. Specifically, with the pinion gear 18 disposed between the actuation mechanism 25 and the face gear 15 when viewed from either axial end of the spool shaft, the size of the housing 3 can be reduced, compared to the prior art, because the actuation mechanism 25 may be disposed in a location which is otherwise partially empty. Therefore, the size of the housing 3 can be reduced, as compared to the prior art.

Figure 7:
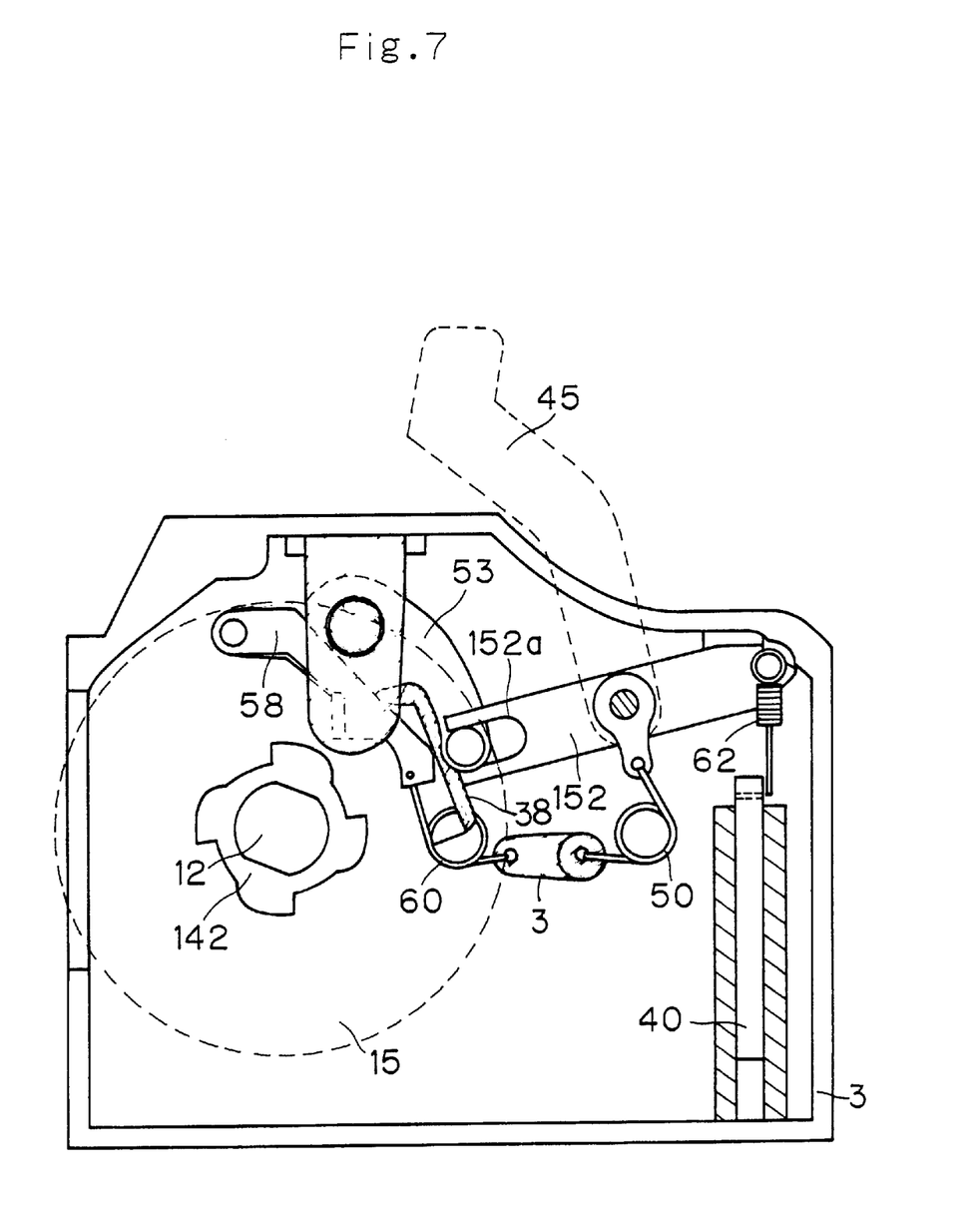
FIG. 7 is a fragmentary, partial cross sectional side view of a fishing reel similar to FIG. 2, showing details of an actuation mechanism in an OFF position in accordance with a second embodiment of the present invention.
Figure 8:
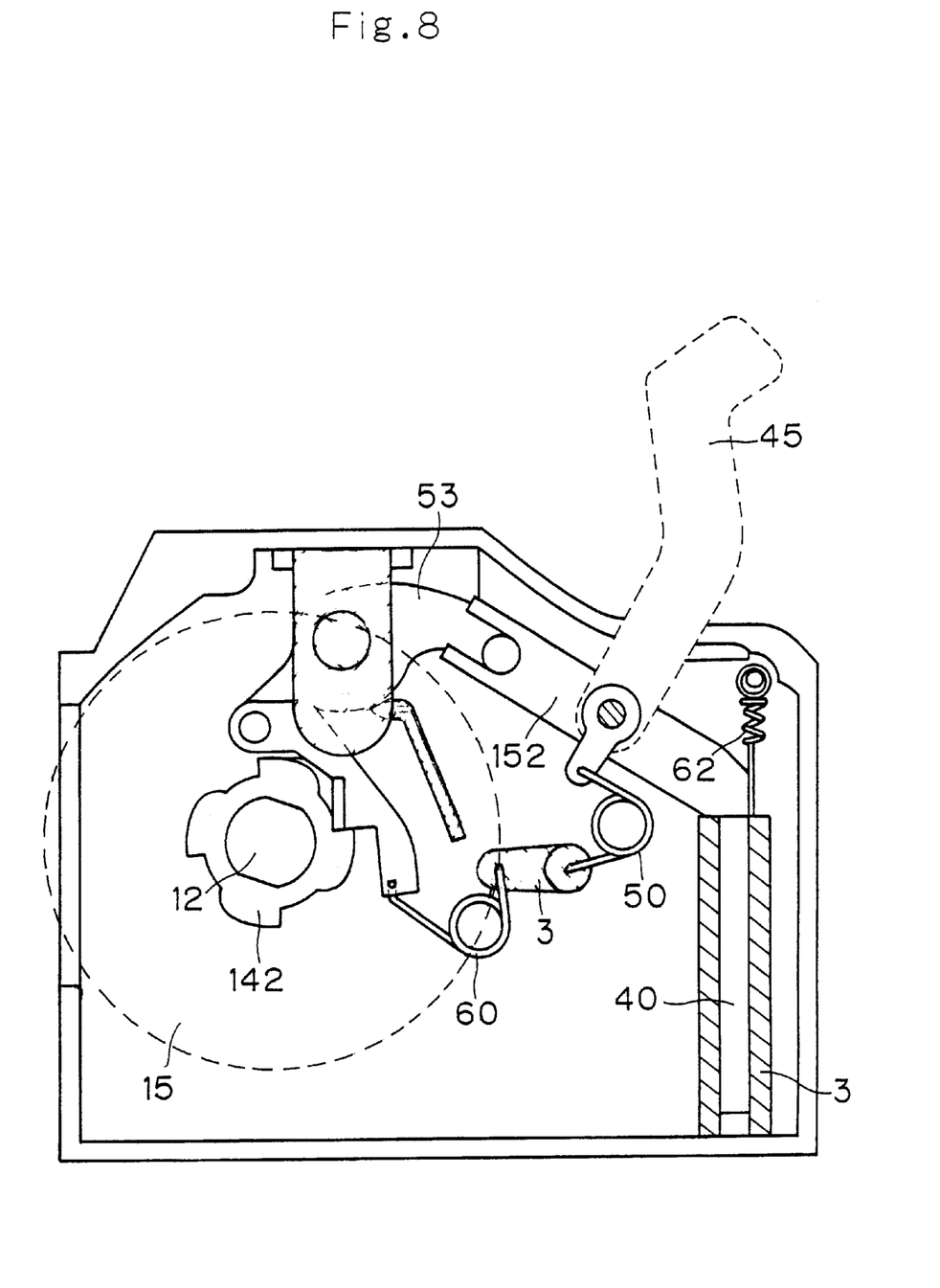
FIG. 8 is a fragmentary, partial cross sectional side view of a fishing reel similar to FIG. 7, showing details of the actuation mechanism in an ON position in accordance with the second embodiment of the present invention.

A second embodiment of the present invention is depicted in FIGS. 7 and 8. The second embodiment operates in generally the same way as the first embodiment but with several minor structural difference. It should be understood generally only those elements which differ from the first embodiment will be described and that those elements not described but having reference numerals in common with the first embodiment are generally the same as the commonly numbered elements in the first embodiment.

In the second embodiment a cam wheel 142 is formed with gear teeth similar to those in the first embodiment. The cam wheel 142 operates in generally the same manner as the cam wheel 42 in the first embodiment.

In the second embodiment, the second lever 152 has an opening 152a which serves the same function as the second lever 52 in the first embodiment, however, the opening 152a has an open end instead of a closed end.

In both the first and second embodiments, the actuation mechanism for the sub-drag mechanism is disposed on the same side of the face gear 15 as the spool shaft with the pinion gear disposed between the actuation mechanism and the face gear. The prior art, on the other hand, has an actuation mechanism disposed on a side of the face gear opposite the pinion gear side, and further the actuation mechanism of the prior art is positioned such that the face gear must be spaced apart from the closest wall of the housing to make room for the actuation mechanism. Since the actuation mechanism of the present invention is disposed on the pinion gear side of the face gear, the housing may be made smaller that the prior art making the overall fishing reel smaller and more compact.

Various details of the invention may be changed without departing from its spirit nor its scope.

Furthermore, the foregoing description of the embodiments according to the present invention is provided for the purpose of illustration only, and not for the purpose of limiting the invention as defined by the appended claims and their equivalents.

What is claimed is:

1. A fishing reel comprising:

a reel housing;

a spool shaft supported in said housing;

a spool supported on a first end of said spool shaft;

a sub-drag mechanism fixed to said housing proximate a second end of said spool shaft, said sub-drag mechanism including a plurality of friction washers concentrically fitted about said second end of said spool shaft and a locking ring supported on said second end of said spool shaft for rotation therewith;

a rotor shaft extending from said housing;

a rotor connected to said rotor shaft for rotation therewith, said rotor being disposed about a portion of said spool for winding a fishing line about said spool;

a drive shaft extending through said housing generally perpendicular to said spool shaft;

a face gear mounted on said drive shaft;

a pinion gear mounted on said rotor shaft, said pinion gear engaged with said face gear such that said rotor rotates in response to rotation of said face gear via said pinion gear; and a sub-drag mechanism actuation mechanism disposed within said housing with said pinion gear disposed between said sub-drag mechanism actuation mechanism and said face gear thus allowing for a reduction in dimensions of said reel housing, said sub-drag mechanism actuation mechanism including a locking lever supported within said reel housing for pivoting movement such that in a first locking lever position a first end of said locking lever contacts said locking ring restricting rotation of said spool shaft and in a second locking lever position said first end of said locking lever is out of contact with said locking ring.

2. The fishing reel as set forth in claim 1, wherein said sub-drag mechanism actuation mechanism further comprises:

a shaft supported within said reel housing, said locking lever being fixed to said shaft for rotation therewith, said shaft extending in a direction perpendicular to said spool shaft.

3. The fishing reel as set forth in claim 2, wherein said sub-drag mechanism actuation mechanism further comprises:

a cam wheel fixed to said drive shaft;

a pivoting lever supported within said reel housing adjacent to said cam wheel, a first end of said pivoting lever being coupled to a second end of said locking lever;

a cam follower, one end of said cam follower being supported on a second end of said pivoting lever and a second end of said cam follower being supported by a toggle spring retained within said reel housing, said cam follower being moveable between a first cam follower position to a second cam follower position in response to movement of said locking lever and said pivoting lever;

wherein in the first cam follower position said cam follower engages said cam wheel such that in response to rotation of said cam wheel said cam follower is urged into a second cam follower position, with said cam follower in the first cam follower position, said locking lever is in the first locking lever position, and movement of said cam follower to the second cam follower position causes said locking lever to move to the second locking lever position.

4. The fishing reel as set forth in claim 3, further comprising a drag mechanism connected between said spool and said spool shaft.

5. The fishing reel as set forth in claim 3, wherein said sub-drag mechanism actuation mechanism further comprises an actuation lever mechanically connected to said shaft for rotation therewith, said actuation being disposed outside of said reel housing, movement of said actuation lever causing movement of said locking lever between the first and second locking lever positions.

* * * * *